Dec. 29, 1970 G. G. JAROSEK 3,551,875

BUS BAR

Filed March 21, 1968 2 Sheets-Sheet 1

INVENTOR.
GORDON G. JAROSEK
BY
Christie, Parker & Hale
ATTORNEYS.

Dec. 29, 1970 | G. G. JAROSEK | 3,551,875

BUS BAR

Filed March 21, 1968 | 2 Sheets-Sheet 2

INVENTOR.
GORDON G. JAROSEK
BY
Christie, Parker & Hale
ATTORNEYS.

3,551,875
BUS BAR

Gordon G. Jarosek, Westminster, Calif., assignor to Lear Siegler, Inc., Santa Monica, Calif., a corporation of Delaware Filed Mar. 21, 1968, Ser. No. 715,001
Int. Cl. H01r *31/08*
U.S. Cl. 339—19 14 Claims

ABSTRACT OF THE DISCLOSURE

A bus bar for electrically coupling a plurality of spaced apart, parallel terminal pins arranged in banks. The bus bars are constructed of elongated strips of electrically conductive material. A portion of the bar is slitted and offset from an adjacent remainder of the bar whereby the two define a passageway through which the pins are inserted. The passageway has a configuration complementary to that of the pin and the slitted portion and the remainder of the bar cooperate to engage the pin and apply a holding force thereto.

BACKGROUND OF THE INVENTION

Field of the invention

This invention relates to bus bars and, more particularly, to a bus bar adapted to be slidably secured to spaced apart terminal pins arranged in banks.

State of the prior art

In the design of electronic assemblies, such as are frequently employed in computers, communication equipment, etc., a great number of serially arranged spaced apart terminal pins require electric interconnections. Generally, these pins are arranged in parallel banks and secured to connectors. The connectors, in turn, connect the pins to printed circuit cards or similar hardware mounted on the connectors.

Often a large number of such terminal pins must be electrically interconnected. In one prior art arrangement, centrally located flat bus bars were installed adjacent the connectors and provided with a plurality of lugs. The terminal pins which were to be interconnected were then wired to the bus bar and thereby electrically coupled. This approach required substantial assembly and installation work and generally required that each terminal pin be wired to a lug on the bus bar by means of a connecting wire and two solder joints. The great number of pins required in such interconnection, often ranging into the hundreds or thousands, necessitates a great amount of effort, time and expense in making such solder joints. Moreover, such joints frequently have inferior electric characteristics, such as higher resistance, when compared to the bus bar, the terminal pins and the connecting wires. In addition, such prior art connections require a substantial amount of space which in some cases is virtually unavailable or which can only be obtained by incurring additional expense. Furthermore, such prior art interconnections often make it difficult to locate trouble spots and, when located, require that solder joints be broken in order to do repair work. Other prior art arrangements include the use of a manually operated tool to wrap connecting wire around selected terminals and the use of clips affixed to terminal posts to fasten connecting wire between selected terminals. These latter approaches eliminate the need for solder connections to the pins but still require the use of connecting wire and the manual connection of the connecting wire to the proper pins by an installer.

There exists, therefore, at the present time a need for a bus bar which is not only economical to manufacture but which is capable of substantially reducing installation, time and expense, which provides better interconnections, reduces the frequency of repairs, and facilitates the making of repairs, when necessary.

SUMMARY OF THE INVENTION

The present invention provides a bus bar or connector for electrically coupling a plurality of spaced apart pins of an electronic assembly. Briefly, it comprises a sheet of electrically conductive material having a width substantially greater than a maximum transverse dimension of the pin. Strips of the sheet defined by spaced apart slits are permanently deformed from a general plane defined by the sheet. The strips thereby define passages adapted to engage the pins. The passages have a configuration complementary to the shape of the pins to provide guidance for the pins and the connector as they are moved relative to each other and to establish electric connections between the sheet and the pins.

In a presently preferred embodiment, one offset strip associated with each passage is permanently deformed out of the general plane of the sheet to form a first generally U-shaped bend. Another strip associated with each passage is permanently deformed out of the general plane of the sheet to form a second generally U-shaped bend oppositely directed from and adjacent to the first bend, a third generally U-shaped bend joining one side of the second bend to the remainder of the sheet, and a fourth generally U-shaped bend joining the other side of the second bend to the remainder of the sheet. The third and fourth bends are oppositely directed from the second bend so a firmer engagement of the pins may be achieved. Preferably one strip of the sheet associated with each passage includes a projection extending towards a plane defined by the sheet, and disposed such that it engages the pin when the pin is inserted in said passage. If the bus bar is to connect only selected ones of the pins and is to bypass others it is undulated along its longitudinal axis so the passages through which the pins pass are offset from the general plane of the sheet. Where no connection is to be made to a pin, no strips are formed in the sheet. As a consequence only predetermined ones of the terminal pins are thereby electrically coupled to the sheet. The general plan of the sheet is spaced apart from the pins.

If the bus bar is installed in an electronic assembly in which undesirable voltages, noises, or other disturbances must be avoided, the bus bar may be shielded. Thin layers of insulating and conductive material are then applied to the exterior of the bar to provide such shielding.

The bus bar of the present invention is simple and relatively inexpensive to manufacture. It can be mass-manufactured by stamping long sheets which are then cut to the desired length prior to installation. More importantly, however, the installation time for interconnecting a selected group of general pins in an electronic assembly, as described earlier, is almost instantaneous.

This invention also provides a new method for interconnecting selected terminal pins in electronic assemblies. Generally speaking, this method includes the steps of placing the elongated strips over the pins such that the passageways defined by the nondeformed portion and the adjacent offset portions are aligned with the pins to be coupled thereto. The strip is then moved transversely to its longitudinal axis toward and into engagement with the pins whereby the bus bar electrically interconnects the selected pins.

The bus bar is constructed such that its strips defining the passageway are biased into engagement with the terminal pin disposed in the passage. This not only provides for a low-resistance electrical connection between the bus bar and the pin, but it applies a holding force to the pin which makes the bus bar shock and shakeproof and thereby prevents unintentional disengagement between the pins and the bar. The bus bar requires no additional space beyond that already available for the installation of the electrical connectors to which the terminal pins are secured since the bar is solely disposed in spaces between the terminal pins. In contrast to the prior art, no space need be allocated in the electronic assemblies to provide for the bus bars.

DESCRIPTION OF THE PREFERRED EMBODIMENTS

Figure 1:
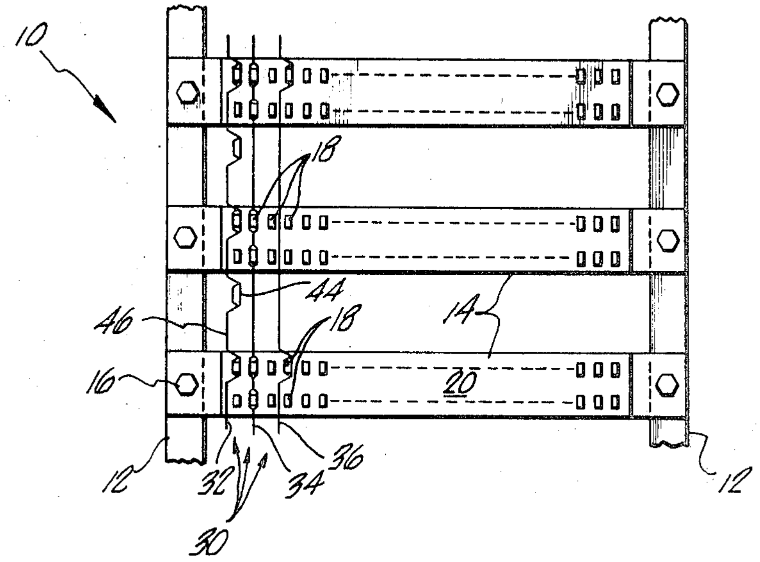
FIG. 1 is a fragmentary, schematic bottom view of an electronic subassembly having connectors with terminal pins and, secured to the pins, bus bars constructed in accordance with the present invention.
Figures 2, 3:
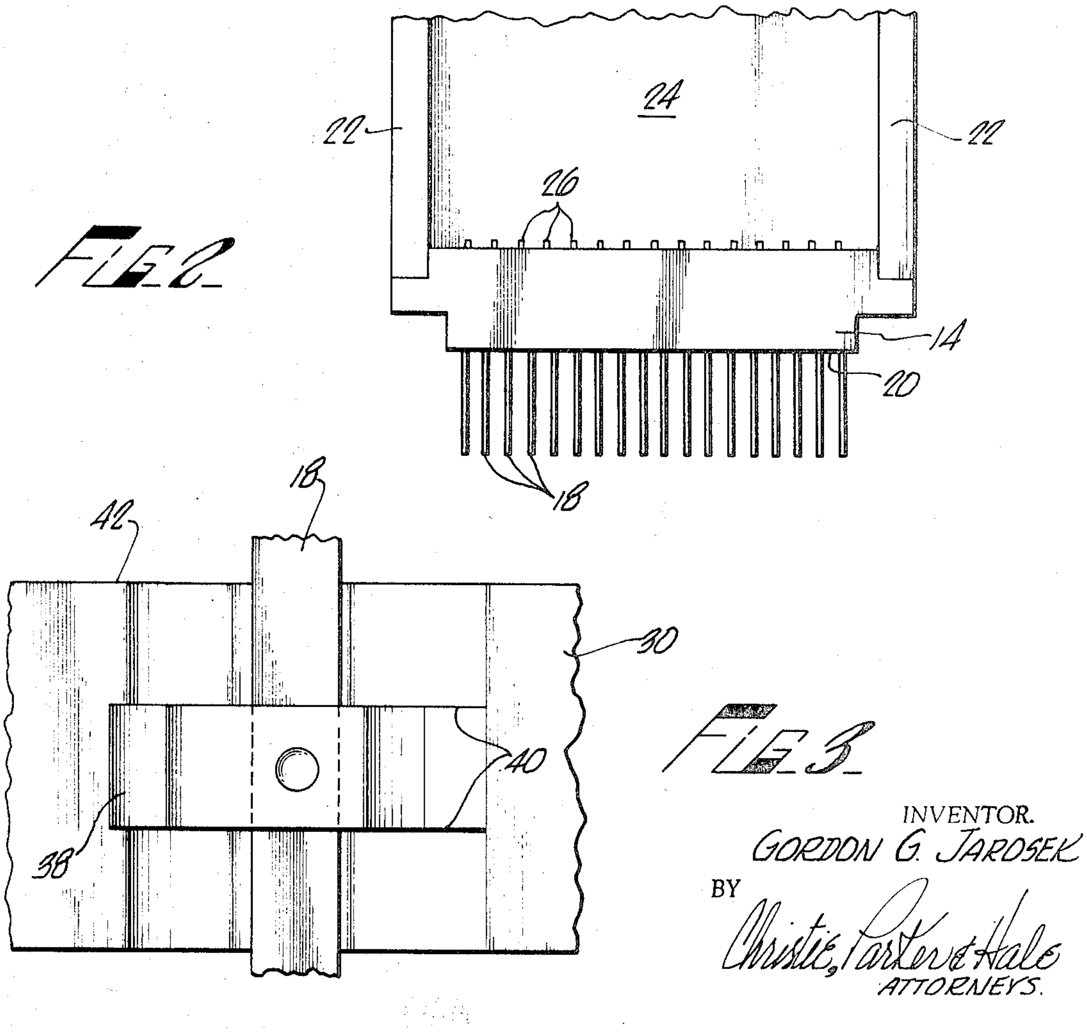
FIG. 2 is a fragmentary side elevational view of the assembly shown in FIG. 1.
FIG. 3 is an enlarged fragmentary, side elevational view of a bus bar constructed in accordance with the present invention and secured to a terminal pin.

Referring first to FIGS. 1 and 2, an electronic assembly 10, for use in a computer or in communication equipment, for example, is mounted on a chassis 12 and includes a plurality of parallel, spaced apart electrical connectors 14. The connectors are of a conventional construction and are secured to the chassis by suitable fasteners such as screws 16. A plurality of spaced apart and parallel terminal pins 18 project from an underside 20 of the connectors. The chassis also includes guide elements 22 which slidably receive printed circuit cards 24 having terminals 26 which coact with the connectors 14 in a known manner. The printed circuit cards can, of course, be replaced by other electric components which coact with the connectors. Since the electronic subassembly forms no part of this invention, it is not further described herein.

When the connectors 14 are installed in the chassis 12 the terminal pins 18 form banks of aligned terminal pins, which are positioned in vertical columns as viewed in FIG. 1. Each connector 14 has two rows of pins 18 as viewed in FIG. 1. It frequently occurs that a plurality of pins in each bank must be electrically interconnected. It may be required that terminal pins in adjacent rows be interconnected or the pins to be connected may be spaced several rows apart having one or more terminal pins between them which are not to be connected. This invention provides bus bars 30 for electrically interconnecting all such terminal pins 18 which require interconnection.

In accordance with the requirements of each particular installation, the bus bars may take a variety of configurations. For simplicity three differently constructed bus bars, respectively identified by numerals 32, 34 and 36, are illustrated in FIG. 1 in a side-by-side relation. The bus bars may have yet other configurations if the particular application so requires.

Figure 4:
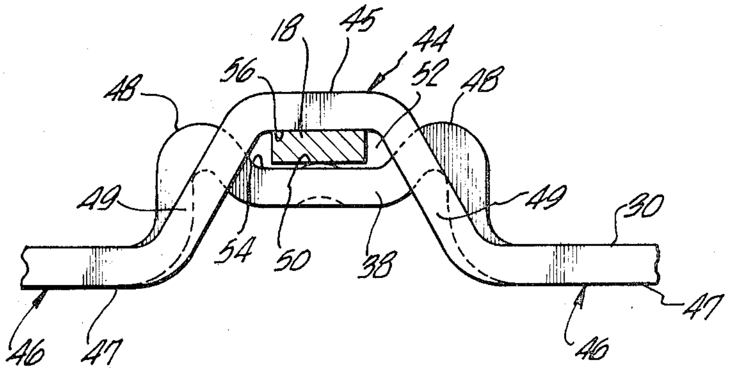
FIG. 4 is a plan view of the bus bar shown in FIG. 3.
Figure 5:
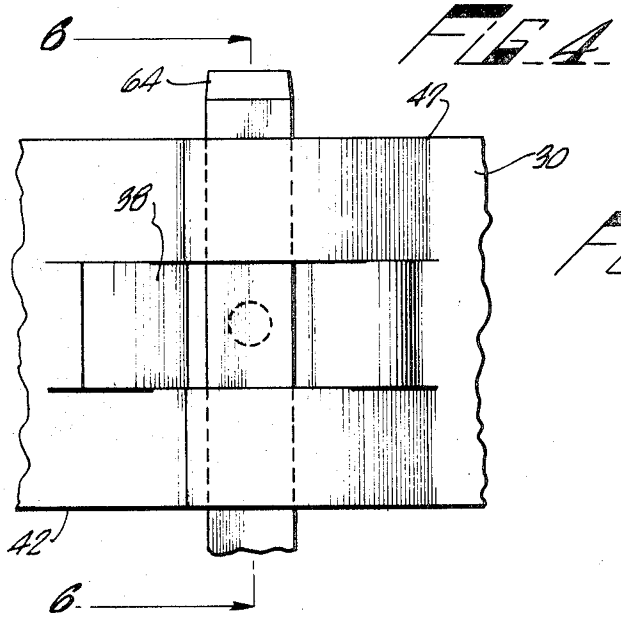
FIG. 5 is a fragmentary, rear elevational view of the bus bar shown in FIGS. 3 and 4.
Figure 6:
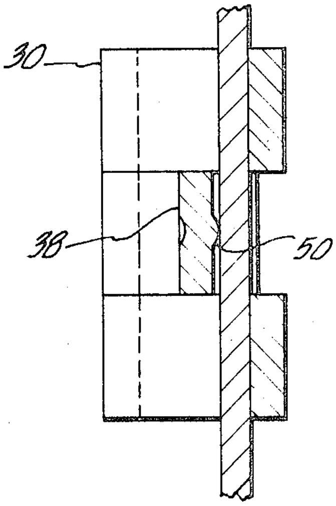
FIG. 6 is a side elevational view, in section, taken along line 6—6 in FIG. 5.

The bus bar 30 will now be described with reference to FIGS. 1 and 3 through 6. The bus bar 30 is a sheet of conductive material that is undulated over its length and defines a plurality of serially arranged, but not necessarily equally spaced, first and second undulations 44 and 46, respectively. Each first undulation 44 has a middle section 45 while each second undulation has a middle section 47. As depicted in FIG. 4, these middle sections 45 and 47 are flat and lie in substantially parallel planes but may, in other embodiments, be arcuately or otherwise shaped. Sloping sides 49 join the middle sections 45 and 47. A center portion 38 is defined on each undulation 44 by a pair of longitudinal slits 40 (FIG. 3) in middle section 45 which are spaced apart and parallel to edges 42 of the bus bar 30. Slits 40 are internal, i.e., they do not extend to the edges of bus bar 30. The center portion 38 is offset from middle section 45 by an amount equal to or slightly greater than the thickness of a terminal pin 18. The center portion 38 spans from one to the other of the sides 49. Ends 48 of the center portion 38 which terminate in sides 49 are radiused and bent outwardly, as shown in FIG. 4, to give center portion 38 springiness and to permit it to be deflected outwardly from middle section 45. The center portion additionally includes a projection 50 facing toward middle section 45. The center portion 38 and middle section 45 are dimensioned to form a passageway 52 to accommodate terminal pin 18 therein. Thus, internal slits 40 define a center strip, i.e., center portion 38, and two side strips. As depicted in FIG. 4, the two side strips are permanently deformed out of the general plane of the bus bar 30 to form a generally U-shaped bend. The center strip is permanently deformed out of the general plane of the bus bar 30 to form a generally U-shaped bend oppositely directed from and adjacent to the bend in the side strips, and generally U-shaped bends, i.e., ends 48, that are oppositely directed from the other bend in the center strip.

Preferably, the center portion 38 also includes a flat guidance surface 54 between the ends 48 which has a width substantially equal to the width of the terminal pin. An opposing flat guidance surface 56 on middle section 45 has a like width to align the pin within passageway 52 when the pin is disposed in the passageway. The longitudinal axis of the bus bar is thus held transverse to the axis of the pin.

To assure proper alignment it is preferred that the bus bar has a width which is substantially greater than the width or maximal transverse dimension of the terminal pin. Best results are obtained when the width of the bar is at least about two times the maximum transverse dimension of the pin. It should also be noted that for best guidance as well for best electrical connection between the bar and the pin, the center portion 38 is spaced from and not adjacent the edges 42 of the bar to assure a secure hold between the pin and the bar.

The center portion 38 is offset from the middle section 45 adjacent the first undulation 44 by an amount which is slightly less than the thickness of the terminal pin 18 to assure an interference or force fit between them. This requires that the center portion be deflected when a pin is inserted in passageway 52 and produces a holding force which prevents shock or vibration from loosening the connection. To enable the same die (not shown) to be used for manufacturing the bus bars, irrespective of the thickness of the terminal pin 18, it is preferred to provide the center portion 38 with projection 50 which engages a terminal pin when it is inserted in the passageway 52. The projection facilitates the ease with which the pin is inserted and, by varying its height, the bus bar can be adapted to accommodate pins of different thickness.

The amplitude of the undulations, or the distance between the middle sections 45 and 47 of the bus bar, is such that when the bus bar is installed the second undulations 46 bypass a terminal pin 18 which is adjacent a terminal pin disposed in the passageway 52. See FIG. 1. In other words, the second undulations 46 are of predetermined lengths such that only selected ones of the pins 18 are interconnected. Bus bars 32 and 34, in FIG. 1, are examples of bus bars having varied lengths of second undulations. Depending upon the width of the terminal pins and their lateral spacing the sides 49 intermediate middle sections 45 and 47 are sloped to clear an adjacent terminal pin that is not to be connected with the bar. Thus, the passages for the pins are offset from the general plane of the bus bar 30, which lies in a plane parallel to and offset from a row of pins. Wherever a connection is to be made to a pin, the U-shaped bends in the strips form a passage for receiving a pin.

Figure 7:
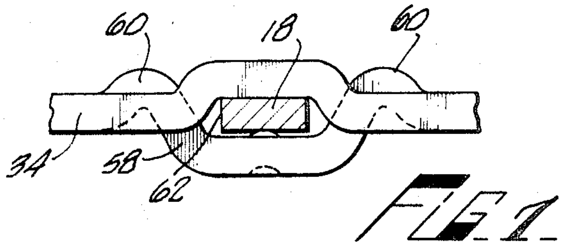
FIG. 7 is a fragmentary plan view similar to FIG. 4 showing another preferred construction of the bus bar.

Referring now to FIGS. 1 and 7, the bus bar 34 represents another embodiment of this invention. Bus bar 34 is straight and not undulated as are bars 32 and 36. It is adapted for applications in which all of the adjacent terminal pins 18 over the full length of the bus bar are to be interconnected or in which terminal pins adjacent interconnected ones are not aligned (not shown) with the pins coupled with the bar. In all other respects, however, this embodiment is identical to the previously described embodiment. Bus bar 34 includes a center portion 58 which is also defined by parallel pairs of slits (not shown) and which includes ends 60 to provide the center portion with springiness. The center portion together with the remainder of the bus bar adjacent it, defines a passageway 62 through which the terminal pin 18 extends. The bus bar and the pin are held together in the above-described manner.

With respect to the installation of a bus bar, a bar having the proper length and spacing between the undulations is first selected and placed adjacent the free ends of the terminal pins 18. The passageways 52, or 62, of the bus bar are aligned with the terminal pins and the bar is thereafter forced towards and into engagement with the terminal pins until the pins are positioned properly within the passageway. During the insertion of the bus bar an interference fit between the pins and the center portion 38, or 58, causes a slight spreading of the center portion relative to the adjacent middle section 45. This spreading is facilitated by the springiness of the center portion obtained by constructing its ends in a slightly curved manner. For greater ease in installing the bus bar onto the terminal pins, the latter preferably include tapered ends 64 (shown in FIG. 5) which gradually spread the center portions upon installation of the bus bar.

Figure 8:
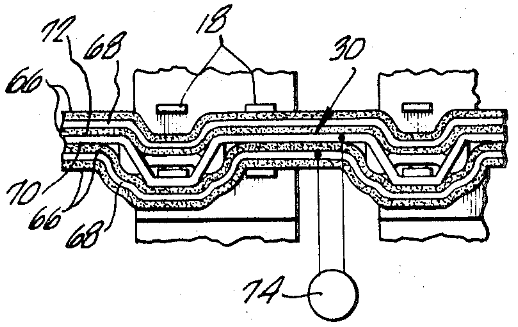
FIG. 8 depicts an embodiment of the bus bar which is shielded.

If the bus bar is installed in an electronic assembly in which undesirable voltages, random noises and other disturbances must be minimized or prevented, the bus bar is shielded by applying thin layers of insulating material 66 and conductive material 68 to the wide sides 70 and 72 of bus bars 30, otherwise identical to that described previously. See FIG. 8. For increased capacitance and higher quality shielding, a conventional capacitor 74, shown schematically in FIG. 8, can be coupled between the bus bar 30 and the conductive material 68 at spaced intervals throughout the length of the bar.

What have been described are considered to be only illustrative embodiments of the present invention. Accordingly, it is to be understood that various numerous other arrangements may be devised by one skilled in the art without departing from the spirit and scope of this invention.

I claim:

1. A bus bar for forming an electrical connection to a connector pin, comprising:

- a sheet of conductive material having an internal slit that divides part of the sheet into two strips;
- one strip being permanently deformed out of the general plane of the sheet to form a first generally U-shaped bend;
- the other strip being permanently deformed out of the general plane of the sheet to form a second generally U-shaped bend oppositely directed from the first bend, a third generally U-shaped bend joining one side of the second bend to the remainder of the sheet, and a fourth generally U-shaped bend joining the other side of the second bend to the remainder of the sheet;
- the third and fourth bends being oppositely directed from the second bend;
- the first and second bends being adjacent and so positioned relative to each other to define together a passage capable of receiving a connector pin with a force fit; and
- the first, third, and fourth bends having peaks lying on the opposite side of the pin receiving passage from the peak of the second bend.

2. The bus bar of claim 1, in which the sheet has two parallel internal slits that divide part of the sheet into a center strip and two side strips; the side strips each being permanently deformed out of the general plane of the sheet to form the first generally U-shaped bend; the center strip being permanently deformed out of the general plane of the sheet to form the second generally U-shaped bend, the third generally U-shaped bend, and the fourth generally U-shaped bend; the first bend of the side strips and the second bend of the center strip being adjacent to each other and so positioned relative to each other to define together the passage.

3. The bus bar of claim 1, in which one strip has a protrusion that extends from its bend that defines the passage towards the bend of the other strip that defines the passage.

4. The bus bar of claim 1, in which the two strips are so deformed that the passage defined by the first and second bends is offset laterally from the general plane of the sheet.

5. The bus bar of claim 4, in which the sheet has two parallel internal slits that divide part of the sheet into a center strip and two side strips; the side strips each being permanently deformed out of the general plane of the sheet to form the first generally U-shaped bend; the center strip being permanently deformed out of the general plane of the sheet to form the second generally U-shaped bend, the third generally U-shaped bend, and the fourth generally U-shaped bend; the first bend of the side strips and the second bend of the center strip being adjacent to and so positioned relative to each other to define together the passage.

6. The bus bar of claim 5, in which the second bend of the center strip has a protrusion that extends toward the first bend of the side strips.

7. The bus bar of claim 6, in which the sheet has a width transverse to the slits that is substantially greater than the maximum transverse dimension of the pin to be received.

8. The bus bar of claim 7, additionally comprising a first layer of insulating material on either side of the sheet, a layer of conductive material on either side of the sheet on top of the first layer of insulating material, and a second layer of insulating material on either side of the sheet on top of the layer of conductive material.

9. The bus bar of claim 8, additionally comprising a capacitor connected between the sheet and one layer of conductive material.

10. An electrical terminal assembly comprising:

- a chassis;
- a plurality of connectors for receiving printed circuit boards mounted on the chassis side by side in parallel relationship;
- a plurality of spaced apart parallel terminal pins arranged in banks on each connector, the terminal pins on the different connectors lying in a row; and
- a bus bar interconnecting selected ones of the terminal pins in a row, the bus bar comprising a sheet of conductive material lying generally in a plane that is parallel to and offset laterally from the row of pins, the sheet being permanently deformed out of the general plane to form undulations at the selected pins that make force fits with the selected pins.

11. The terminal assembly of claim 10, in which the sheet has an internal slit at each undulation that divides part of the sheet into two strips, one strip being permanently deformed out of the general plane of the sheet to form a first generally U-shaped bend, the other strip being permanently deformed out of the general plane of the sheet to form a second generally U-shaped bend oppositely directed from the first bend, and the first and second bends being adjacent to each other and so positioned relative to each other and the selected pin to engage the selected pin in a force fit.

12. The terminal assembly of claim 11, in which the other strip has a third generally U-shaped bend joining one side of the second bend to the remainder of the sheet and a fourth generally U-shaped bend joining the other side of the second bend to the remainder of the sheet, the third and fourth bends being oppositely directed from the second bend, and the first, third, and fourth bends having peaks lying on the opposite side of the selected pin from the peak of the second bend.

13. An electrical connection comprising:

a row of parallel, electrically conductive pins;

a sheet of electrically conductive material generally lying in a plane that is parallel to and offset laterally from the row of pins; and a plurality of electrical connections between selected ones of the pins and the sheet, each connection comprising an internal slit in the sheet parallel to the row of pins, a first strip formed from the slit, the first strip being permanently deformed out of the general plane of the sheet to form a first generally U-shaped bend, a second strip formed from the slit, the second strip being permanently deformed out of the general plane of the sheet to form a second generally U-shaped bend oppositely directed from the first bend, the first and second bends being adjacent to each other and so positioned relative to each other to surround the selected pin and to form therewith a force fit.

14. The connection of claim 13, in which the second strip has a third generally U-shaped bend joining one side of the second bend to the remainder of the sheet, and a fourth generally U-shaped bend joining the other side of the second bend to the remainder of the sheet, the third and fourth bends being oppositely directed from the second bend, and the first, third, and fourth bends having peaks lying on the opposite side of the selected pin from the peak of the second bend.

References Cited

UNITED STATES PATENTS

| | | | |
|---|---|---|---|
| 2,747,170 | 5/1956 | Batcheller | 339—258 |
| 2,960,674 | 11/1960 | Harton | 339—14 |
| 2,981,926 | 4/1961 | Boardman | 339—256(SP) |
| 3,249,905 | 5/1966 | Ruehlemann | 339—18(C) |
| 3,399,374 | 8/1968 | Pauza et al. | 339—91 |
| 3,401,369 | 9/1968 | Palmateer et al. | 339—17 |
| 3,410,952 | 11/1968 | Knaub et al. | 174—88 |

MARVIN A. CHAMPION, Primary Examiner

J. H. McGLYNN, Assistant Examiner

U.S. Cl. X.R.

174—36, 88; 339—256